US005694669A

United States Patent [19]

Porper

[11] Patent Number: 5,694,669

[45] Date of Patent: Dec. 9, 1997

[54] POOL STICK REPAIR APPARATUS

[76] Inventor: Joseph Porper, 7741 Alabama Ave. Unit 1, Canoga Park, Calif. 91303

[21] Appl. No.: 677,650

[22] Filed: Jul. 8, 1996

[51] Int. Cl.[6] B29P 23/00

[52] U.S. Cl. 029/33 R

[58] Field of Search 29/33 R, 33 K; 473/49, 1; 30/494; 451/552; 144/330, 134.1; 142/1

[56] References Cited

U.S. PATENT DOCUMENTS

| | | | |
|---|---|---|---|
| 4,471,824 | 9/1984 | Zownir | 144/330 |
| 5,208,985 | 5/1993 | Carter | 30/494 |
| 5,228,160 | 7/1993 | Porper | 451/552 X |

*Primary Examiner*—William R. Briggs

*Attorney, Agent, or Firm*—Gilbert Kivenson

[57] ABSTRACT

A motor driven turning device in which a one piece pool stick may be inserted for the purpose of cutting away an old ferrule and tip, adding a new ferrule and tip, machining the latter to a smooth finish and refurbishing the body of the stick.

7 Claims, 2 Drawing Sheets

POOL STICK REPAIR APPARATUS

BACKGROUND OF THE INVENTION

Some players of pool or billiards provide their own sticks which they carry to each set of games in specially made cases and assemble the sticks prior to starting the games. Most players, on the other hand, use one-piece sticks which are provided by the management, and are stored in vertical racks near the pool or billiard tables. These sticks must be retipped at fairly frequent intervals, and are sent out for refurbishing after several weeks of play because of wear of the ferrules, damage to the shaft, or abrasion of the finish. Ordinarily, this is an unavoidable expense associated with the operation of a billiards or pool room.

The present invention permits the refurbishment to be done in-house. Because of the lower expense, it can be done more frequently. This will prevent more serious damage from occurring while permitting more accurate and satisfying play by the customers.

The present invention is in the form of a lathe which accommodates the whole length of a one-piece pool stick. The ferrule can be turned or replaced, new ferrules added and new tips cemented. The pool stick can be sanded and nicks built up and smoothed. Slow revolving of the stick as it is being sprayed will result in a professional looking finish. Even though they require more time, present manual methods often produce unsatisfactory results.

SUMMARY OF THE INVENTION

The invention is constructed in lathe form; it allows a one-piece pool stick to be inserted at one end through a motor drive, through a central, self-centering collet support, finally coming to rest a short distance from a head stock. The head stock can be moved parallel to the bed of the lathe (and to the pool stick) by a hand-driven, screw mechanism. A tool post is fastened into the head stock. A cutting bit is clamped in the tool post. The pool stick is turned by a stepless, adjustable electric motor. The tool post assembly can be used to cut away old ferrules, trim new ones and dress new tips.

The invention uses collets made of plastic in its drive and central supports so that the pool stick may be firmly grasped without marring the finish. The collets permit the stick to be automatically centered with one loosening and tightening of each collet.

DESCRIPTION OF THE INVENTION

Figure 1:
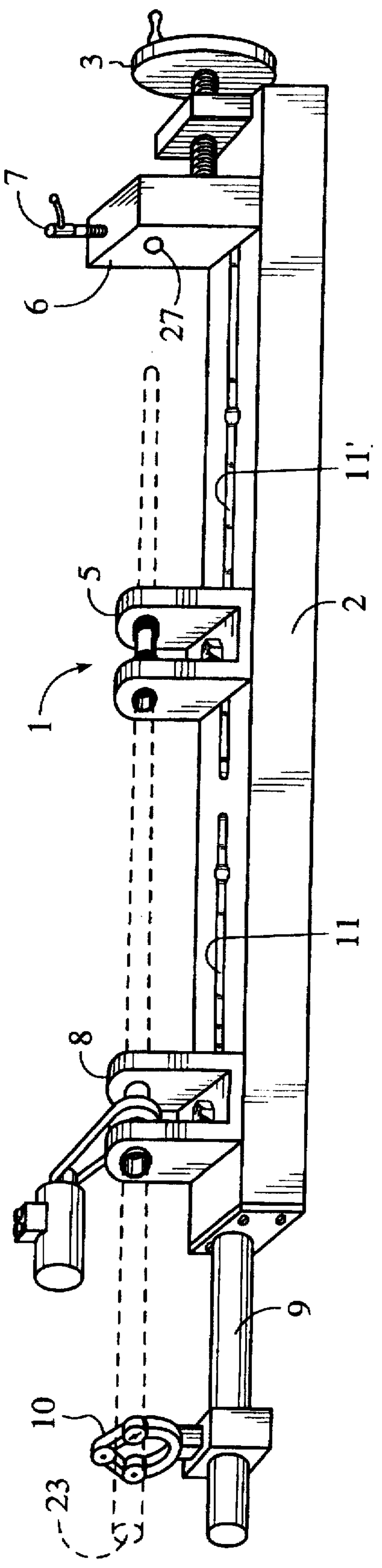
FIG. 1 is an isometric view of the invention showing the lathe bed, moveable head stock, center support collet, motor drive assembly and the steady rest.
Figure 2:
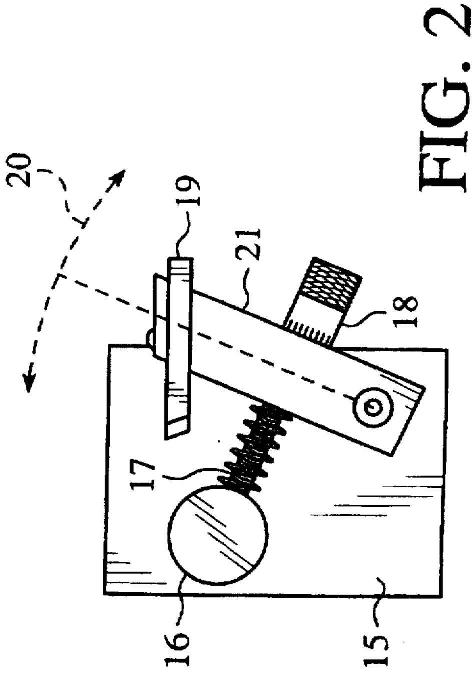
FIG. 2 is a front view of the moveable tool post assembly.
Figure 3:
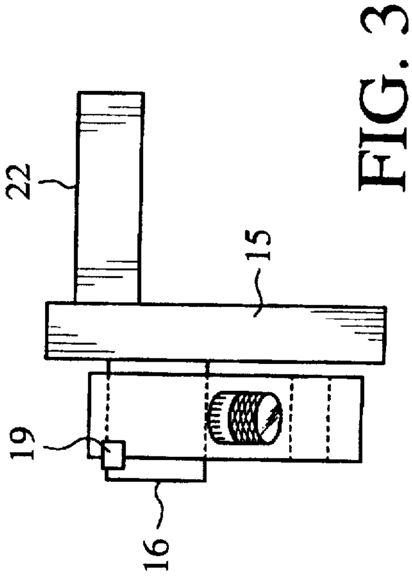
FIG. 3 is a side view of the tool post assembly.
Figure 7:
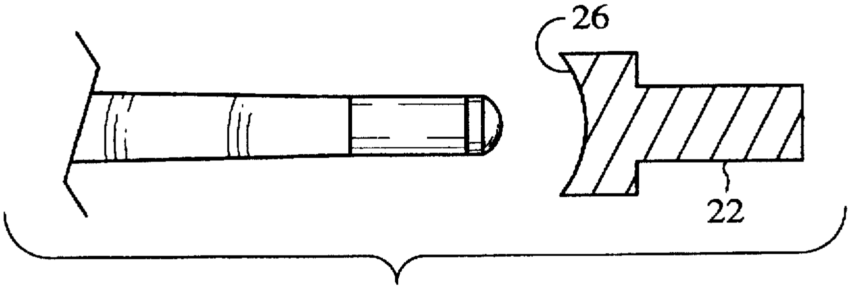
FIG. 7 is a top view of a retipping set-up showing a cross section of a retipping centering tool.

The invention will be described by reference to FIGS. 1–7. FIG. 1 is a perspective of the invention 1 which is supported by the bed 2 provided with slots 11 and 11'. A slidable head stock 6 contains cylindrical opening 27 and the threaded clamping lever 7. Drive wheel 3 connects through a bearing block to a threaded bar 4 which enters block 6 through a threaded opening. Turning of wheel 3 causes block 6 to move to the right or left in slot 11'. A tool post plate 15 (FIGS. 2 and 3) contains the cylindrical extension 22 which is inserted in opening 27 and held at a desired angular position by clamping lever 7. The tool post plate contains the pivoted tool post 21 which can be moved along the arc 20 by turning of the calibrated, knurled drum 18 which threads over a non-traveling nut onto spring-loaded screw 17. The screw 17 rests against a backup cylinder 16 so that turning it in either direction forces the tool post 21 to move. This has the effect of moving the cutting bit 19 closer or away from the rotating ferrule of a pool stick. When a suitable distance is found, the drive wheel 3 is turned to feed the cut. A threading die can be attached to a horizontal cylinder (similar to cylinder 22 shown in FIG. 3.) The threading die can then be locked into opening 27 and used to rethread the end of a cue stick to receive a new ferrule. A new tip can then be added by cementing. The new tip 27 can be centered by use of centering bar 26 as shown in FIG. 7.

Figure 5:
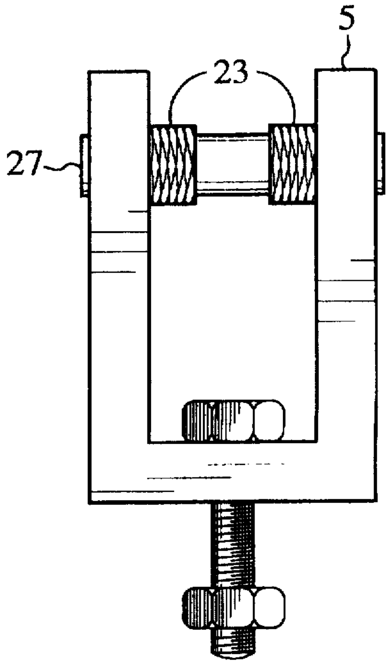
FIG. 5 is a side view of the center support collet.
Figure 6:
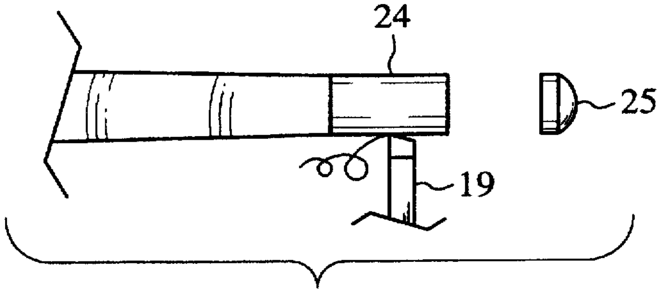
FIG. 6 is a top view of a machining operation on a pool stick ferrule.

The central holding section is shown in FIG. 5. A plastic collet 27 is contained within the center part of Section 5. Turning the knurled handles 23 in one direction loosens the collet to permit insertion of the stick and position it at a desired point along the bed 2. Turning the handles 25 in the opposite direction tightens the collet. The collet is mounted in ball bearings to permit free rotation of the pool stick after it is mounted.

Figure 4:
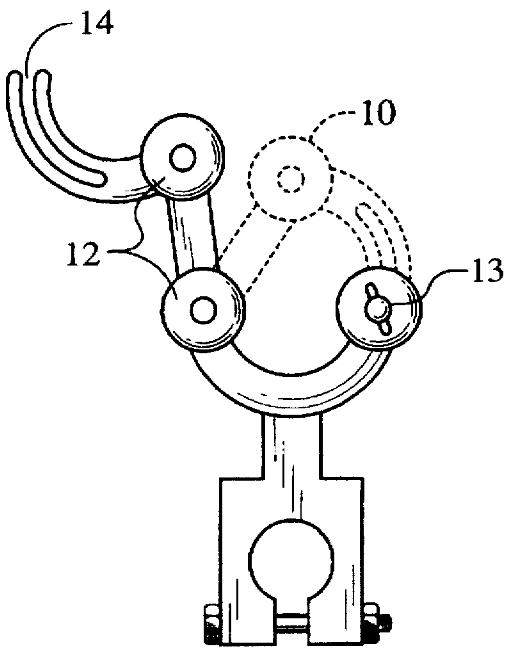
FIG. 4 is a front view of the steady rest.

The steady rest 10 is shown in more detail in FIG. 4. Freely-rotating, rubber-tired idler wheels 12 and 13 are mounted as illustrated. A moveable beam connects two of the wheels while the split fork 14 connects the second and third wheels through a wing nut on the third wheel's axle. This arrangement permits rapid adjustment to the diameter of the pool stick and thus obtain smooth rotation.

The invention is equipped with a variable speed motor so that rotational speed can be altered from high for cutting, to low for drying various finishes.

A number of tools which are known to the art of lathe turning can be adapted to this invention by providing them with cylindrical mounting bars which can be inserted in the opening 27 (FIG. 1) and clamped. Included would be tenon-making tools, threading dies, and circle-turning tools for rounding cue tips.

The invention can also be used for sanding and polishing the pool stick by using a strip of sandpaper or cloth while the stick is rotated at high speed. Dents and nicks can be repaired using various fillers, and then sanding and polishing after these materials have hardened but the stick is still mounted in the invention.

What is claimed is as follows:

1. A pool stick repair apparatus comprising in combination:
   - a. holding means for rotatably clamping the pool stick;
   - b. turning means for revolving said stick around its axis while clamped;
   - c. cutting means for turning down and removing any ferrules and cue tips joined to the end of said stick;
   - d. repair means for adding new ferrules;
   - e. retipping means for aiding in the gluing of new tips and for trimming the tips;
   - f. polishing means for refurbishing said pool stick.

2. A pool stick repair apparatus as described in claim 1 in which said holding means for rotatably clamping is comprised of a ball bearing equipped collet assembly whereby the pool stick can be clamped along its axis and held rigidly parallel to the base of the apparatus while being rotated about its axis.

3. A pool stick repair apparatus as described in claim 1 in which said turning means is a motor-driven, bearing-mounted second collet which can be used to apply rotational motion to a pool stick which is mounted in both the first and second collets.

4. A pool stick repair apparatus as described in claim 1 in which said cutting means is a cutting tip carrying tool, tiltable toward one end of said pool stick, and moveable along the stick's axis to achieve a material removing action when the stick is revolving.

5. A pool stick repair apparatus as described in claim 1 in which said repair means for adding new ferrules is a threading device for renewing the thread on the end of said stick after the old ferrule is cut off.

6. A pool stick repair apparatus as described in claim 1 in which said retipping means is a hollow centering tool which mounts on the end of the invention and can be used to exert pressure on a newly cemented tip as it is drying on the end of the stick.

7. A pool stick repair apparatus as described in claim 1 in which said polishing means is a strip of abrasive material held against the stick as it is being retained and spun in the invention.

* * * * *